United States Patent Office 3,370,205
Patented Feb. 20, 1968

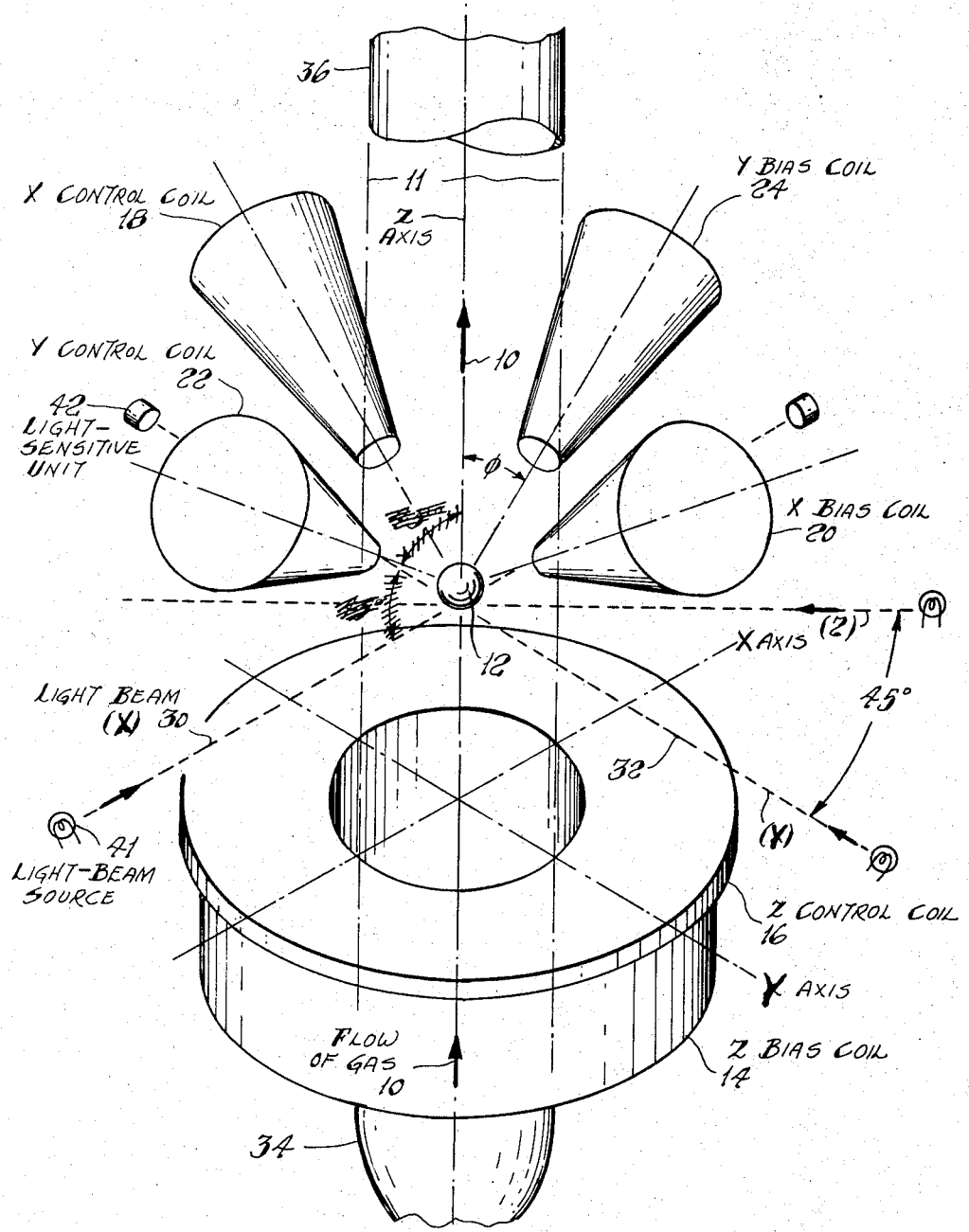

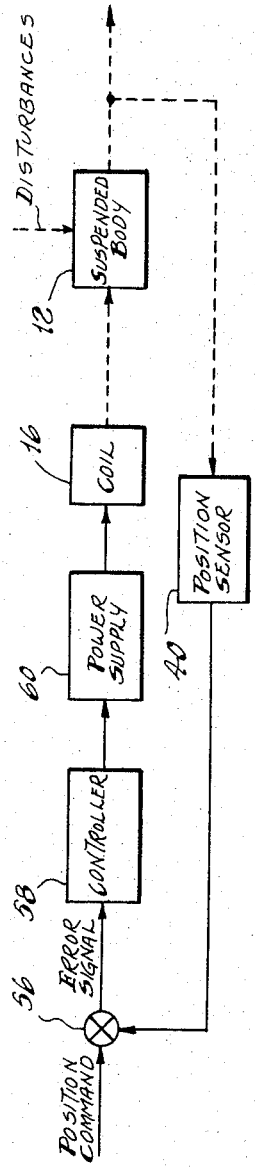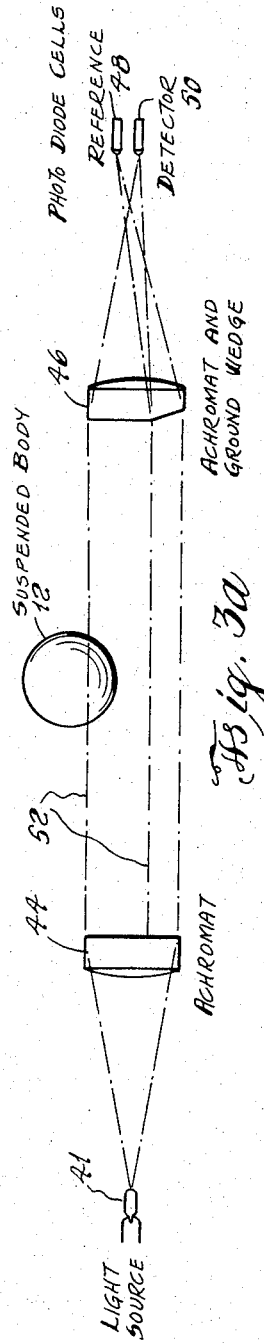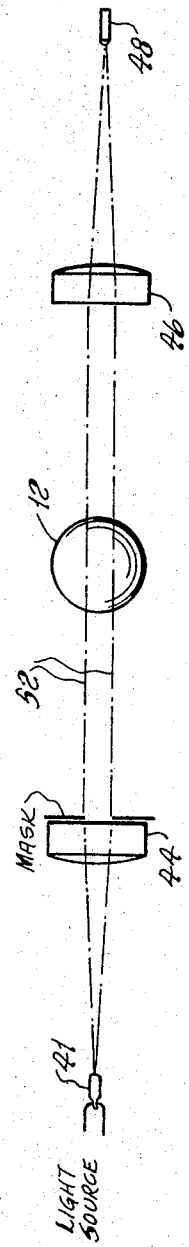

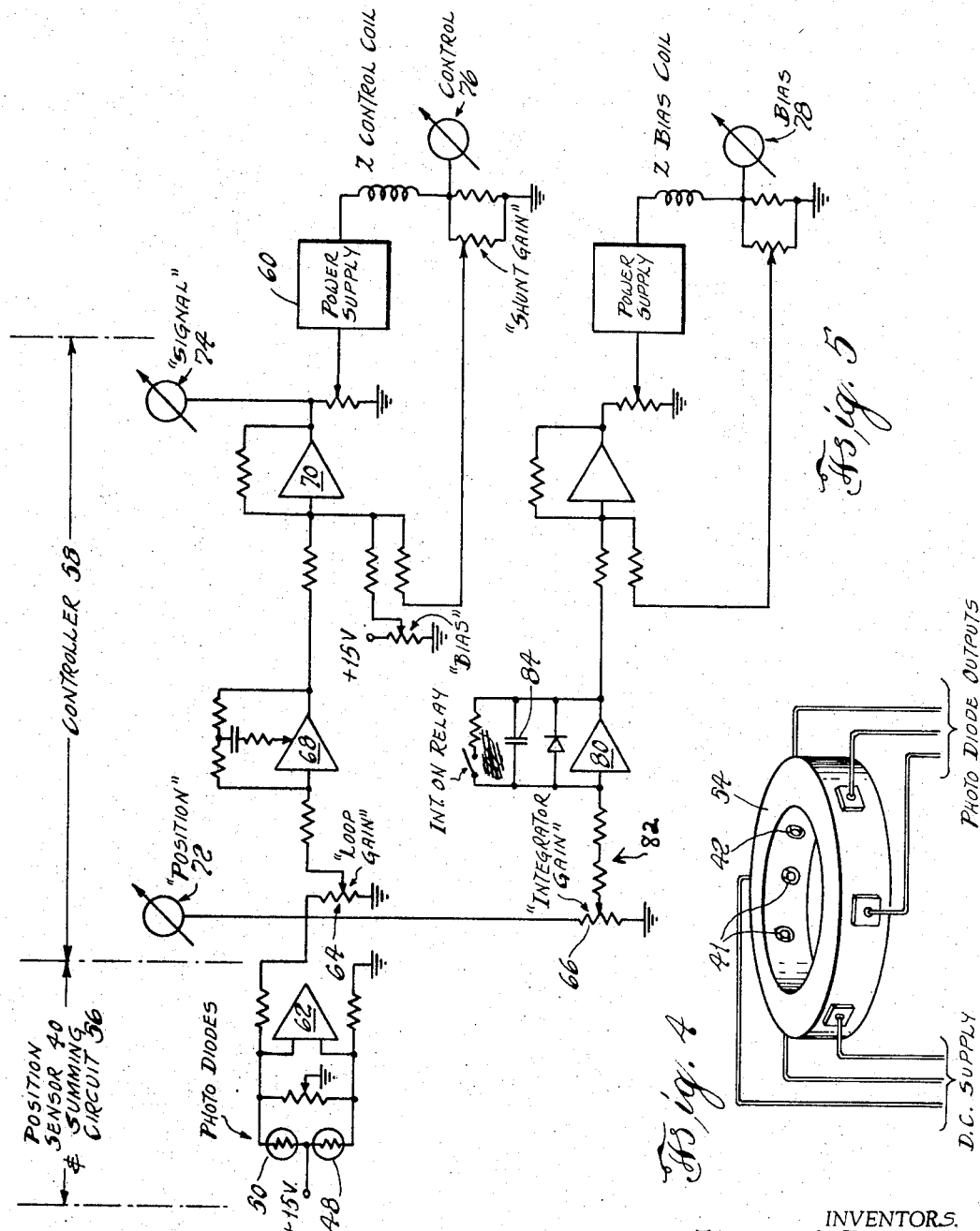

3,370,205
MAGNETIC SUSPENSION SYSTEM
Theodor A. Dukes, Princeton, and Ricardo N. Zapata, Kendell Park, N.J., assignors, by mesne assignments, to the United States of America as represented by the Secretary of the Navy
Filed Sept. 27, 1965, Ser. No. 490,751
8 Claims. (Cl. 317—123)

This invention relates to apparatus for magnetically supporting a body and especially to an electromagnetic suspension system for magnetically supporting a body in a wind tunnel.

In designing an airplane, investigation of the flow pattern of a wind stream (which may be air, or another gas, or a suitable fluid) around the surfaces of the plane and of the behavior of the plane in flight is accomplished by building a model of the plane and testing it in a wind tunnel. The model must be suspended in the wind stream in some way and this is usually done by mechanical means. However, any mechanical means has some surface which is exposed to the wind stream and which creates its own flow pattern, thereby distorting the flow pattern of the model. It is therefore desirable to have a suspension system which does not suspend the model by mechanical means and does not distort the flow pattern of the model in any way.

The objects and advantages of the present invention are accomplished by supporting an object (hereinafter designated a "suspended body") in a wind tunnel solely by magnetic forces. A typical embodiment of the invention employs three sets of electromagnetic coils in a suitable arrangement to provide the forces necessary to suspend the body. The currents in the coils are automatically adjusted to compensate for changes in the position of the suspended body by means of feedback systems which are controlled by position-sensing means.

An object of this invention is to provide non-mechanical means to suspend a body in a wind stream.

Another object is to suspend a body in a wind stream without distorting in any way the flow pattern created by the body.

Another object is to provide a suspension system for supporting a body in a wind stream, the suspension system creating no flow pattern of its own in the wind stream.

Other objects and many of the attendant advantages of this invention will be readily appreciated as the same becomes better understood by reference to the following detailed description when considered in connection with the accompanying drawings wherein:

FIG. 1 is a schematic diagram showing the relationships of the coils of the suspension system, the wind stream direction and the sensing-beam positions;

FIG. 2 is a block diagram illustrating the feedback control system of this invention for one axis;

FIG. 3a is a side view in schematic form showing the geometrical arrangement of the light source, its beam-forming components, the suspended body and the photodiode elements of the position sensor for the z axis when the suspended body is spherical in shape;

FIG. 3b is a top view of FIG. 3a;

FIG. 4 is a pictorial representation of the "optic ring" which houses the light sources and photodiode units used in this invention; and FIG. 5 is a schematic diagram of the axis circuits used in the block diagram of the feedback control system of FIG. 2.

Similar numerals refer to similar parts throughout the several views.

FIG. 1 illustrates the arrangement of the magnetic-field-producing elements (preferably coils so that the current therethrough can be varied to change the field strength) and optical elements of the position sensor. Specifically, FIG. 1 illustrates the geometrical arrangement of the various coils and the sensing-beams of light with respect to the air-stream direction in a wind tunnel. The flow of gas (which may or may not be air although the flow of any type of fluid therein will hereinafter be called a wind stream), it is in the vertical z direction in this diagram and is denoted by the arrows 10. The suspended body 12 lies on or near the z axis within the wind stream which is indicated by the broken lines 11 and is channeled through the test area. For clarity, the test section of the wind tunnel, between the nozzle 34 and the exhaust 36, is not shown in the figure. The main coil of the system, the z axis bias coil 14 (hereinafter, the word "axis" will be understood in designations which use the letters $x$, $y$ and $z$) is oriented so that its axis coincides with the z axis and its magnetic field provides a force which acts downward along the z axis, in alignment with the magnetic moment of the spherical suspended body 12. The magnetization of the suspended body can either be provided by the main coil 14 itself or by the resultant field of the main coil and a magnetizing coil along the same axis. The position of the body 12 along the coil axis is controlled by means of an electronic feedback system, the circuit of which is shown in block form in FIG. 2. A light beam, which lies in the horizontal plane of FIG. 1, senses the position of the body 12 relative to the z axis and controls, by means of amplifiers and a stabilizing network, the current flowing through the z bias coil 14. The light-generating and light-receiving elements are similar for all axes and comprise a light beam source 41 and a light-sensitive unit 42 consisting of a pair of photodiodes as will be described hereinafter.

The position of the body 12 in the plane perpendicular to the z axis (the horizontal plane if the z axis is considered to be vertical, as in FIG. 1) is controlled by means of two lateral pairs of coils, the $x$ control coil 18 and its associated $x$ bias coil 20, and the $y$ control coil 22 and its associated $y$ bias coil 24. The axes of each one of a given pair of coils form a Y with respect to the main coil axis. If the axes of the coils are projected downward onto the horizontal plane, the axes of the $y$ set will lie along the dashed line 30 perpendicular to the path of the $y$ axis sensing beam, and the axes of the $x$ set will lie along the dashed line 32 perpendicular to the path of the $x$ axis sensing beam. The currents in the two coils of a pair are equal and their fields are vectorially additive at the point of suspension. The current in each control coil of a pair is controlled by an electronic feedback system in turn controlled by light-sensing means, as was described in the case of the z axis coil pair.

There are two different coils acting along the z axis, as shown. The larger one, the bias coil 14, provides the bulk of the magnetization of the sphere 12 and most of the average gradient needed to keep the sphere in place. This coil balances a large fraction of the steady flow drag force acting on the sphere 12. The average current in the smaller coil, the z control coil 16, provides the rest of the average field requirement. Its primary role is, however, to produce the fast field variations needed for stabilization of the sphere in the z direction.

The sum of the average currents in the two z coils is such that the resultant field balances the z component of the aerodynamic force acting on the body when it is at a suitable point above the z coils and between the $x$ and $y$ coils. This point is called the nominal equilibrium point or position.

In the case of axisymmetrical bodies, no stead-state lateral forces will occur in the vertical tunnel. If only one lateral coil were provided per axis of control, it would have to operate with current sign reversal about zero. To avoid this situation, two additional coils are provided, the lateral bias coils 20 and 24. Each produces a fixed bias force in one of the two lateral axes. Each lateral control coil is paired with a lateral bias coil. The pair work "against" each other so that the average control coil current is not zero but equal to the fixed current in the associated bias coil. The truncated cone shape of the coils (see FIG. 1) makes efficient use of the available space near the suspended body and thus of the available power.

In an alternative arrangement, each coil of a pair is split so that the bias current flows through one half of each coil and the control current flows through the other half in opposite sense to the bias current. The resultant average magnetic force along each lateral axis balances the corresponding component of the aerodynamic force acting on the body in the nominal equilibrium position.

The coil arrangement provides an orthogonal-control-force axis system and because of the lack of coupling between control axes makes possible the application of simple feedback control loops.

A functional block diagram of the control feedback system is shown in FIG. 2. This is a conventional feedback control system. The position-sensing means, or position sensor 40, comprises a light source 41 (see FIG. 3), a pair of lenses, the first 44 being a plano-convex achromat and the second 46 being a combination of a plano-convex archromat and a ground wedge, and a pair of light-sensitive photodiode cells, the reference cell 48 and the detector cell 50. The resistance of a photodiode cell varies in proportion to the intensity or amount of light impinging upon it and can therefore be used to vary proportionately the amount of voltage or current being fed to the input of an amplifier, as is evident in the circuit shown in FIG. 5. The reference cell 48 is used as a matched compensating reference element in a bridge circuit, which contains the position-sensing, or detector, element 50, in order to reduce the sensitivity to temperature and light-source variations. The paralleled light beam 52 is partially shadowed by the suspended body 12, one-third of the light beam being shadowed in nominal equilibrium position. The remaining two-thirds of the beam is split into two beams by means of a prism 46. The one-third adjacent to the suspended body 12 is focused on the position-sensing element 50 and the remaining one-third is focused on the reference element 48.

The entire optics for all three sets of axes is imbedded in a rigid "optical ring" 54 (see FIG. 4) which is located just above the $z$ control coil 16 and the axis of which is coincident with the $z$ axis. Any alternative rigid mounting of the optical elements with respect to each other and to the coil system may also be used. The beam for $z$ axis control (whose light source 41 is shown in the center of the other two light sources) is at one end (lower end) of the suspended body and the lateral beams are centered in the plane of the center of gravity of the suspended body. An electrical signal from the position sensor 40, corresponding to the amount of displacement of the body 12 from its equilibrium position, is fed back to a summing component 56 where it is combined with a "position command" signal which controls the equilibrium position current through the coil. The combined signal, or error signal, is fed to the controller unit 58 which provides the power supply 60 with the voltage needed to obtain the proper current output from the power supply for the particular coil, e.g. 16, being controlled.

FIG. 5 illustrates one circuit which fits the block diagram of FIG. 4. The circuit will not be described in detail since such circuits are known to the art. The electronic components of the position sensor 40 and the summing component 56 comprise a bridge circuit in which photodiodes 48 and 50 form bridge elements, and an operational amplifier 62. The position reference signal and the feedback signal are actually combined in the bridge circuit, the output of which is the error signal. The error signal is fed to a pair of paralleled potentiometers 64 and 66 which act as gain controls and further amplified and modified in the operational amplifier 68 of the controller unit 58.

The output of the operational amplifier 70 controls the amount of current supplied by the power supply 60 to the $z$ control coil, the current being measured by the meter 76 (marked "control"). In the diagram, the meters are not actually inserted into the circuit as they would be in practice, but are only indicated symbolically at the points at which they measure either current or voltage. Thus meter 78 measures the current through the bias coil, meter 74 (marked "signal") measures the output voltage of amplifier 70 and meter 72 (marked "position") measures the error voltage.

The first operational amplifier 80 in the bias coil section of the $z$ axis controller is made into an integrating amplifier by means of the resistor 82 and condenser 84 combination, thereby always maintaining the average current in the $z$ control unit in the center of the range of the control power supply 60.

Although the invention was designed to support spherical bodies, it can be used to support bodies of elongated shape by imbedding therein a magnetizable sphere at the center of the body or a pair of spaced magnetizable spheres.

Obviously many modifications and variations of the present invention are possible in light of the above teachings. It is therefore to be understood that within the scope of the appended claims the invention may be practiced otherwise than as specifically described.

We claim:

1. A magnetic suspension system for supporting in a substantially invariant orientation a magnetizable suspended body whose position may vary comprising, in combination:
   a system of three sets of magnetic-field-producing (m.f.p.) elements,
   said sets arranged to produce three orthogonal magnetic forces which suspend the body and control its movement with respect to three orthogonal axes,
   the magnetic force component produced by each set being a function of an electrical parameter in such a way that the average value of said parameter is that required to position said suspended body at its nominal equilibrium point,
   position-sensing means for detecting changes in position of said suspended body along said three orthogonal axes and for providing signals proportional in value to said changes, and
   feedback control means for utilizing each of said change-proportional signals to vary the value of said parameter in the proper set of m.f.p. elements to produce the compensatory change in its field strength required to return said body to its nominal equilibrium point along the axis associated with that set of m.f.p. elements.

2. The magnetic suspension system of claim 1, wherein each of said m.f.p. elements is an electromagnetic coil, and said electrical parameter is the electrical current which flows through each coil.

3. The magnetic suspension system of claim 1, wherein there are two m.f.p. elements in each of said three sets, and wherein it can be considered that the three said axes comprise an orthogonal axis system ($x$, $y$ and $z$),
   The $z$ set of m.f.p. elements being coaxial with the $z$ axis, the axes of the $x$ set lying in a first plane, and the axes of the $y$ set lying in a second plane,
   said planes being orthogonal to one another.

4. The magnetic suspension system of claim 1, wherein there are two m.f.p. elements in each of said three sets, one element of one set being employed to provide the main field strength for positioning said suspended body at a nominal equilibrium position along the axis associated with its set, and the other element being employed to provide the field strength necessary to compensate for rapid changes in the nominal equilibrium position of said body along its associated axis, one element of each of the other two sets providing a constant biasing field so that the average fields provided by the control elements are in the centers of the ranges of their field variations.

5. The magnetic suspension system of claim 1, wherein said position-sensing means includes, for each axis, a light source, a lens for collimating the light into a beam and photodiode means for producing an electrical signal whose strength is proportional to the deviation of the suspended body from its nominal equilibrium position.

6. The magnetic suspension system of claim 2, wherein there are two coils in each set and wherein it can be considered that the three said axes comprise an orthogonal axis system ($x$, $y$ and $z$), the $z$ set of coils being coaxial with the $z$ axis, the axes of the $x$ set lying in a first plane and the axes of the $y$ set lying in a second plane, said planes being orthogonal to one another.

7. The magnetic suspension system of claim 2, wherein there are two coils in each of said three sets, one coil of one set being employed to provide the main field strength for positioning said suspended body at a nominal equilibrium position along the axis associated with its set, and the other coil being employed to provide the field strength necessary to compensate for rapid changes in the nominal equilibrium position of said body along its associated axis, one coil of each of the other two sets providing a constant biasing field so that the average fields provided by the control coils are in the centers of the ranges of their field variations.

8. The magnetic suspension system of claim 2, wherein said position-sensing means includes, for each axis, a light source, a lens for collimating the light into a beam and photodiode means for producing an electrical signal whose strength is proportional to the deviation of the suspended body from its nominal equilibrium position.

References Cited

UNITED STATES PATENTS

| | | | |
|---|---|---|---|
| 2,856,238 | 10/1958 | Dacus | 317—155.5 X |
| 3,112,962 | 12/1963 | Lautzenhiser | 308—10 |
| 3,155,437 | 11/1964 | Kinsey et al. | 317—123 X |
| 3,184,271 | 5/1965 | Gilinson, Jr. | 308—10 |

LEE T. HIX, *Primary Examiner.*